Dec. 6, 1966   W. E. MORLEY   3,290,478
APPARATUS FOR MANUFACTURE OF CONTAINERS
Filed May 21, 1963   3 Sheets-Sheet 1

INVENTOR
WILLIAM E. MORLEY
BY
ATTORNEY

INVENTOR.
WILLIAM E. MORLEY
BY
ATTORNEY

Dec. 6, 1966  W. E. MORLEY  3,290,478
APPARATUS FOR MANUFACTURE OF CONTAINERS
Filed May 21, 1963  3 Sheets-Sheet 3

INVENTOR.
WILLIAM E. MORLEY
BY
ATTORNEY

United States Patent Office 3,290,478
Patented Dec. 6, 1966

3,290,478
APPARATUS FOR MANUFACTURE OF
CONTAINERS
William E. Morley, Bay Village, Ohio, assignor to Union
Carbide Corporation, a corporation of New York
Filed May 21, 1963, Ser. No. 281,917
3 Claims. (Cl. 219—79)

The invention relates to containers, and also relates to a method and an apparatus for making containers.

Metal containers, such as battery cans, food cans, beer cans, soft drink cans, flashlight cases, paint cans, and the like, are usually made by mechanically attaching a preformed cover over an open end of a preformed cylinder or tube, or by impact extrusion or deep drawing. Mechanical techniques include rolling, curling, crimping, and the like, which usually turn an edge of one of the parts over or with an edge of the other part, sometimes with solder as an aid in effecting a good seal.

Although the above mechanical techniques are satisfactory in general, they usually involve the use of spinning or rolling heads which tend to wear rapidly during use, and usually require the addition of a sealant, such as a rubber gasket or a cement, to the joint to effect a seal against fluids. Furthermore, the time required for such mechanical operations limits the rate at which a production line can operate. Impact extrusion and deep drawing are expensive, and sometimes are completely inoperable with brittle metals.

The primary object of the invention, therefore, is to provide a method and apparatus for making containers at a high rate of speed.

Another object is to provide a construction of a container which is amenable to high production rates.

Another object is to provide a combination of a container body and a cover which is amenable to making a container at a high rate of speed.

Figure 1:
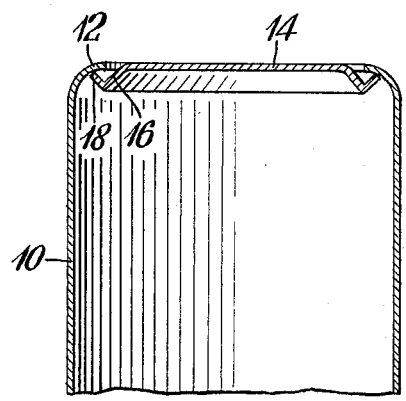
FIGS. 1 to 4 are sectional views of a cover disposed on a container body in accordance with the invention.

Broadly, the invention comprises a container made by providing a particular combination of a cover and a container body, disposing the cover against the container in a certain manner and under a positive pressure, and then passing an electric current across the junction between the two to raise the temperature of the juncture to fusion temperature. In order for this process to work at high rates of speed, the cover and container body must be formed to fit together with only a substantially linear contact therebetween and to be amenable to fast handling of the parts.

It was found that a cover and container body may be fused rapidly and in a continuous process if either the cover or the container body is formed with a curl around its free end. As used herein, the term curl means an integral portion of a work piece, whether curved or straight, disposed at an angle with respect to the main plane or direction of the work piece. For example, an end of a tube which is turned in or out with respect to the tube wall is considered as a curl. Likewise, the outer edge or portion of a disc which is turned or bent away from the main plane of the disc is considered to be a curl, and this applies whether the curl itself is actually curved or straight in cross section.

A curl on either the cover, the container body, or both provides a means by which the cover can be easily centered over the open end of the container body to permit fast parts handling and also provides an area on which a corner of the other part can be disposed to form only a substantially linear contact between the cover and the container body, thus permitting rapid fusion between the two parts of the container during a burst of electric current across the contact. As used herein, the term "substantially linear contact" means a contact which is in the nature of a line and which forms only a very narrow area, preferably as small as possible. Thus, the process of the invention comprises providing a cover and a container body, at least one of which has a curl on its free end and the other of which has a corner at its end corresponding to an area on the curl, disposing the two pieces together with the corner against the area to form only a subtsantially linear contact between the two, applying a pressure across the contact, and then passing an electric current across the contact in an amount sufficient to heat the contact to fusion temperature.

The apparatus of the invention for making containers at a high rate of speed broadly comprises a rotatable turret having a plurality of stations spaced around its axis, each of said stations comprising means for holding a cover over the open end of a container body, feed means for feeding a container body and a cover of a shape in accordance with the invention to each of the stations as the turret rotates and in a position in which the cover can be held against the container body, means for actuating the holding means at a place later in rotation than the feed means, means for supplying an electric current across the contact between the cover and container body while under positive pressure to fuse the two parts together in each of the stations to form a succession of containers, and means for removing the containers from the stations as the turret rotates. As used herein, the term "turret" means a rotatable structure which is a base or holder for operations or tools.

Referring now to the drawing, FIGS. 1 through 4 are cross-sectional views of a cover disposed over an open end of a container body in accordance with the invention. In FIG. 1, a cylindrical container body 10 has a curl 12 around the periphery of its free end, and a cover 14 is disposed over the open end. The cover 14 has a curl 16 around its free end or periphery, and its free end has a corner 18 thereon which fits against an area on the curl 12 of the container body 10 to form only a substantially linear contact in the nature of a circle between the cover 14 and the container body 10.

Figure 2:
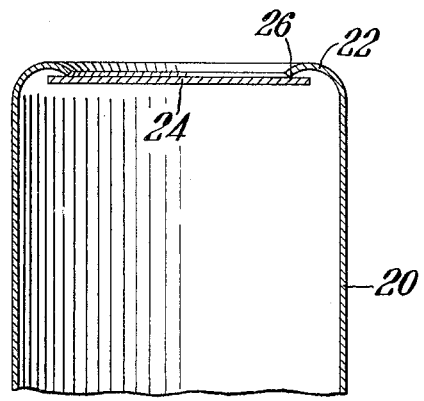
Figure 3:
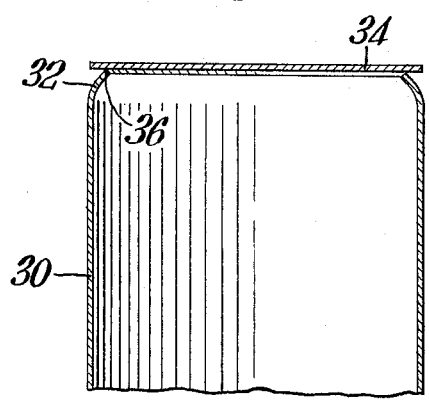
Figure 4:
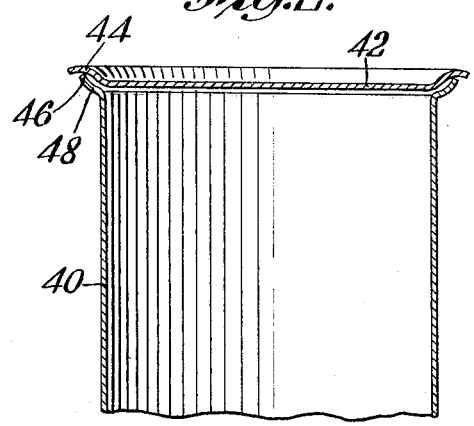

FIG. 2 is a cross-sectional view of another construction in accordance with the invention. The open end of a cylindrical container body 20 with a curl 22 around the periphery of its free end is closed by a flat cover 24 which fits against a corner 26 at the free end of the container body 20. FIG. 3 is a similar view of a container body 30 having a slight curl 32 on its end and a flat cover 34 disposed over the open end of the container body 30 and fitting against only a corner 36 on the free end of the container body 30 to form only a substantially linear contact between the two main parts. FIG. 4 is a similar view of another embodiment in which a container body 40 with an open end is closed by a cover 42 having a curl 44 around its periphery which fits against a corner 46 on a curl 48 around the free end of the container body 40. Those in the art will realize that a number of constructions similar to those described above will provide a substantially linear contact between the two parts as long as one of the parts has a curl on its periphery.

Containers are made in accordance with the invention from the above or similar constructions of a container body and a cover by disposing the cover on the container body to form a substantially linear contact, applying a pressure across the junction or contact between the two parts, and then passing an electric current across the contact in an amount sufficient to heat the contact to fusion temperature. For thin steel containers such as galvanic dry cell jackets (0.025 inch thick or less), a burst of electric current, for example, a burst lasting about 1/60 of a second, at high current rates is sufficient to fuse the cover to the container body. A positive pressure, that is, a compressive force, across the contact is desirable during current flow to hold the parts in their relative positions and in contact until after the fused contact has cooled. Any pressure which may be considered positive or compressive is sufficient for this purpose. For thin steel dry cell jackets and other containers made of thin steel, pressures between about 1000 and about 1200 pounds and current rates of between about 45,000 and about 50,000 amperes have been demonstrated as adequate to ensure that fusion occurs completely along the junction. For the fusion of other metals such as aluminum, or the fusion of two different metals such as zinc and steel, other ranges may be desirable. Sometimes it is advantageous to make the container component (cover or container body) having a corner which fits against an area on the other component thicker or heavier than the other to ensure that its corner can press firmly against the area of the other without damaging itself.

Figure 5:
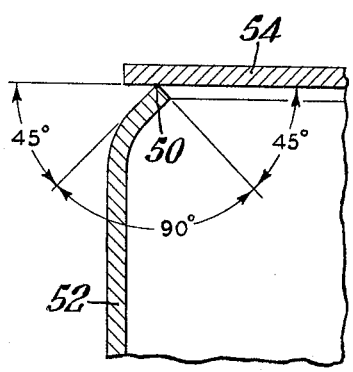
FIGS. 5 and 6 are fragmentary sectional views of a cover disposed on a container body in accordance with the invention.
Figure 6:
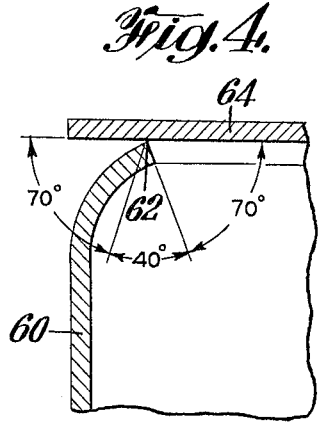

Any substantially linear contact between the cover and the container body will suffice for the purposes of the invention, but the contact is preferably formed by a corner of one piece fitting against an area on the other piece to form angles in cross section of between about 25 and about 65 degrees between the sides of the corner and the area surface. To provide such angles, a further preferred limitation is that the corner form an angle of between about 50 and about 130 degrees. As shown in FIG. 5, a preferred construction comprises a corner 50 of about 90 degrees on a container body 52 fitting against an area on a cover 54 in a manner which provides angles in cross section of about 45 degrees between the area surface and the two sides of the corner 50. Similar angles are likewise preferred when a corner on a cover fits against an area on a container body. FIG. 6 illustrates a less preferred but operable construction in which a container body 60 has a corner 62 on its free end of about 40 degrees formed by a lip on the free end of the container body 60. At least one of the angles in cross section between the sides of the corner 62 and an area on the cover 64 is, as a result, a minimum of about 70 degrees.

Further preferred limitations for fast handling of parts, ease of operations, and a strong joint between the container body and the cover are that the container body should have a curl on its free end whether or not the cover includes a curl, and that the two parts should be positioned against each other in a manner which does not permit slippage between the parts as the parts are fused, that is, the area involved in the contact should be in a plane substantially perpendicular to the axis of the container body.

It will be appreciated by those in the art that container bodies and covers in accordance with the invention can be made easily with conventional equipment and techniques, such as stamping, spinning, coining, and the like, in contrast to constructions in which spurs or projections must be specially provided by difficult casting or gouging before the fusion process. In fact, it is preferable in the present process to have a sharp corner without burrs fitting continuously against a smooth, substantially flat area, although small burrs, lips, or rough places acquired during stamping or like techniques can be tolerated. In this regard, the covers and container bodies for the instant process can be made by conventional techniques in a manner which restricts any burrs formed therein to places other than the corner and area involved in the substantially linear contact.

Figure 7:
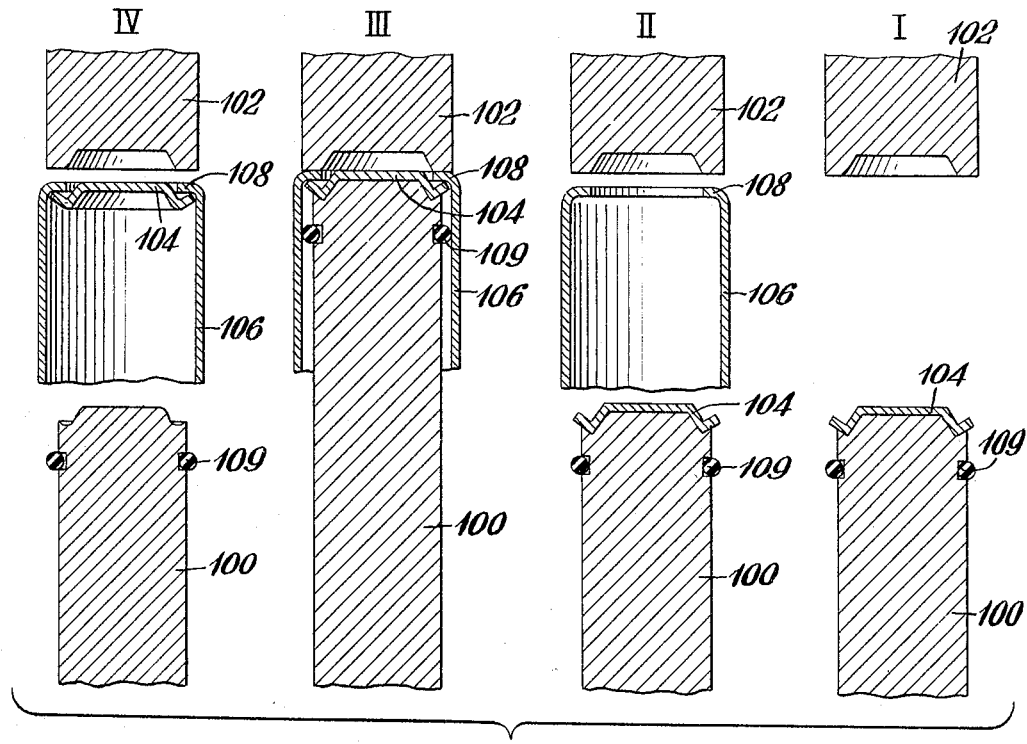
FIG. 7 is a schematic view of the several main operations of the apparatus of the invention.

Referring now to FIG. 7, which is a schematic view of the sequential operations of the apparatus of the invention, a pair of electrically conductive heads is shown in a vertically opposed position, the bottom head 100 being movable towards the stationary top head 102. The face of the bottom head 100 is shaped to receive and fit against a cover 104 for a container body 106, and the top head 102 is shaped to fit against the container body 106, specifically a curl 108 around an open end of the container body 106.

In Operation I, the cover 104 is disposed between the two opposing heads 100 and 102 and in a position in which it can be held subsequently against the container body 106. Preferably, the cover 104 is disposed directly on the bottom head 100 when the bottom head 100 is shaped to receive it and when gravity acts to hold it on the bottom head 100. In Operation II, the container body 106 is disposed between the two heads 100 and 102 and in a position in which the cover 104 can be held subsequently against the container body 106. The manner in which the cover 104 and the container body 106 can be held in place will be discussed hereinafter.

In Operation III, the movable bottom head 100 is forced up until a corner on the periphery of the cover 104 fits firmly against an area on the curl 108 of the container body 106. As shown in Operation III of FIG. 7, the top head 102 fits only against the curl 108 on the container body 106, and the bottom head 100 fits only against the cover 104. To prevent the bottom head 100 from touching the container body 106, an insulator 109 in the nature of an O-ring is preferably placed around the bottom head 100 a short distance below its face, which insulator also helps to center the container body 106 over the bottom head 100 as it is forced up towards the top head 102.

While in this position, an electric current is supplied to the electrically conductive heads 100 and 102 in an amount sufficient to heat the contact between the cover 104 and the container body 106 to fusion temperature as the current passes through the contact. Current flow for a time up to about 1/60 of a second has been found sufficient to effect a fusion on thin steel. Preferably, the heads 100 and 102 are maintained in this position for a short time, for example, a fraction of a second, after current flow to prevent breakage of the fusion before it cools.

In Operation IV, the movable head 100 withdraws from the container body 106 to be advantageously disposed while the container comprising the cover 104 and the container body 106 is removed from the space between the heads 100 and 102.

Figure 8:
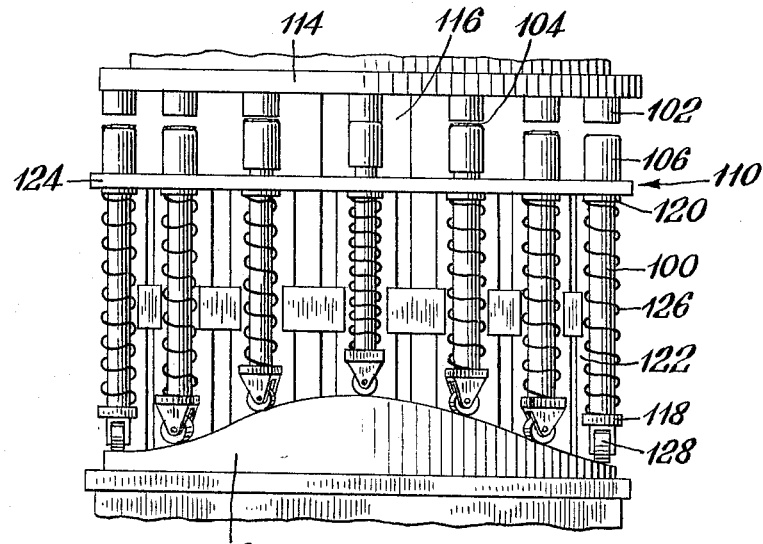
FIG. 8 is a fragmentary view of the apparatus of the invention.

FIG. 8 is a fragmentary perspective view of an apparatus which performs the above operations continuously to make a succession of containers. The apparatus comprises a rotatable turret 110 and a stationary cam track 112 disposed below the turret 110. The turret 110 comprises a plurality of stations disposed around its axis, and each station comprises a stationary top head 102 and a movable bottom head 100. The top heads 102 are attached to a top head mounting plate 114 which is in turn mounted on a central drive shaft 116. Each of the movable bottom heads 100 has a bottom guide 118 fixedly attached near its bottom and a top guide 120 slidably attached near its top. Bottom guide 118 and top guide 120 fit slidably in a guide track 122 which is mounted on the drive shaft 116. Other types of guide means will be apparent to those in the art, including guide means in the nature of a cylinder in which each of the heads 100 slides. It should be noticed at this time that as shown each station around the axis of the turret 110 comprises the same set of parts.

A working table 124 having holes therein through which the bottom heads 100 move is mounted on the drive shaft 116, and also acts as a backing plate for the top guides 120. Each of the holes is of a size larger than the outside diameter of the bottom heads 100 but smaller than the outside diameter of a container body 106, thus permitting the bottom heads 100 to pass but preventing the container bodies from falling from the top surface of the working table 124.

A spring 126 is disposed around each bottom head 100 and between the top and bottom guides 118 and 120 to ensure that the bottom head 100 stays at its lowest position unless otherwise forced upwards. The spring 126 may of course be mounted in coaction with each bottom head 100 in a number of ways which keep the bottom head 100 at its lowest position, and in fact is preferably mounted in a manner other than around each head 100 when the head 100 carries high current rates. A roller 128 is mounted on the bottom end of each bottom head 100, and rides on the cam track 112 which is shaped to move the bottom heads 100 up towards the top heads 102 at the appropriate time and in succession as the turret 110 rotates. Preferably, the cam track 112 is so shaped that the top face of a bottom head 100 in a particular station is below the top surface of the working table 124, or otherwise advantageously disposed, while a cover 104 and a container body 106 are fed to that station (on the side of turret 110 opposite the side shown in FIG. 8). The station on the right side of the turret 110 in FIG. 8 illustrates this position. Furthermore, the cam track 112 may include means such as a pressure cylinder or piston at the position at which a cover is held against a container body to ensure that the pressure across the contact between a cover and a container body is the one most desirable, and also to provide versatility in the machine.

After the cover 104 and the container body 106 are disposed in a particular station, the bottom head 100 is forced up by the cam track 112 as the turret rotates until the cover 104 and the container body 106 are held in position under pressure between the bottom head 100 and the top head 104. In FIG. 8, this action is shown by the several stations in succession from the right side of the drawing to its center. At this point, the two heads 100 and 102 are supplied with an electric current to fuse the cover 104 to the container body 106. After the burst of electric current, the cam track 112 is shaped to keep a pressure across the fused joint for a short time during turret rotation, and it then recedes to permit the bottom head 100 to withdraw from the container body 106 until the top face of the head 100 is below the top surface of the working table 124, or otherwise advantageously disposed for removal of the finished container from the station. This position is shown at the left side of FIG. 8.

The apparatus just described can make containers at a very rapid rate since the time required for fusion is about 1/60 of a second. Thus, the turret can rotate at relatively high speeds, and turn out a number of containers equal to the number of stations on the turret for each revolution. A turret having twelve station and revolving at 0.5 revolution per second, for example, will produce 360 containers per minute. With a larger turret containing more stations, or more revolutions per second, the output can be increased to a very high rate, such as 1000 containers per minute, depending on the speed at which the parts can be handled. Furthermore, the output can be doubled by passing one container production line along only one side of the machine and also passing another production line along the other side.

Figure 9:
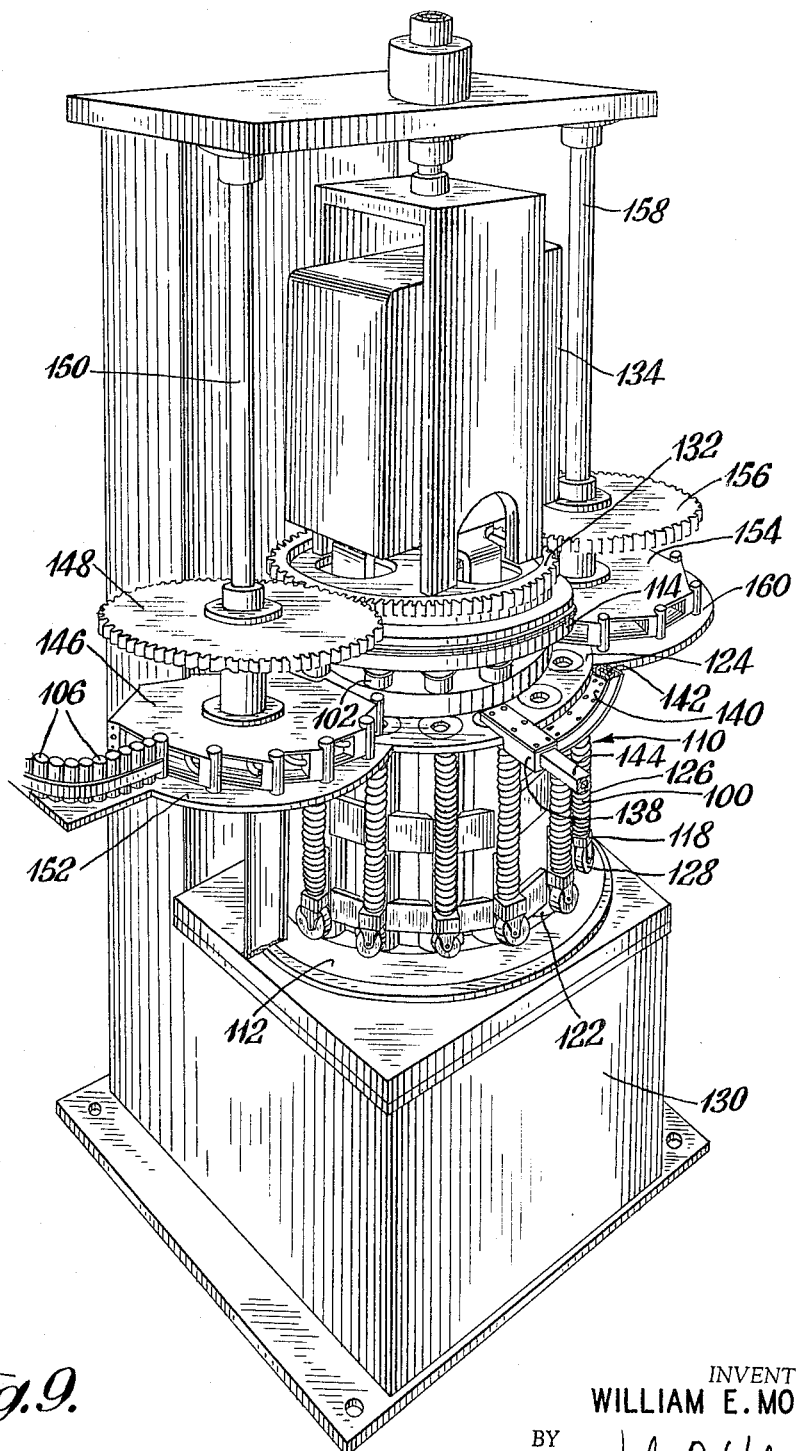
FIG. 9 is a perspective view of the complete apparatus of the invention.

A complete apparatus of the invention is shown in perspective in FIG. 9 with the front side of the fragmentary view in FIG. 8 being the back side in FIG. 9 and the same parts having the same reference numbers. As there shown, the turret 110 and cam track 112 are mounted on a base 130, which houses the drive mechanism for the turret 110. A drive gear 132 is mounted on the top head mounting plate 114, and a transformer 134 is mounted on the turret 110. The primary side of the transformer 134 is electrically connected to a source of electricity (not shown) by a brush and slip ring means (not shown) or other suitable means for electrically connecting stationary and rotary devices. The secondary side of the transformer 134 is connected to the bottom and top heads 100 and 102 by suitable cables or bars (not shown) in a manner which permits current flow between the opposed heads 100 and 102. These electrical connections will be apparent to those in the art, and are thus not specifically shown in the drawing. It will also be apparent that either the bottom heads 100, the top heads 102, or both should be insulated from the remainder of the turret 110 to prevent current flow at a place other than between the bottom heads 100 and the top heads 102. Since the top heads 102 are stationary, it is easier to insulate them than the movable bottom heads 100.

The source of electricity (not shown) is preferably a high voltage source controlled by a timing device set to discharge a burst of current to the transformer and thus to the heads 100 and 102 when the heads 100 and 102 in a particular station are holding a cover against a container body under positive pressure. The transformer converts the high voltage electricity from the source into low voltage, high current electricity for the fusion step. The timing device is preferably an ignitron or other relay-rectifier, but other devices such as a condenser are also satisfactory. The feature of the transformer 134 rotating with the turret 110 is very important in machines suitable for high rates of production, since the low voltage, high current electricity preferred for the fusion step is difficult to control by a timing device such as an ignitron and difficult to transmit because of large energy losses at the high current rates. A transformer 134 rotatably mounted with the turret 110 solves these problems. Any other means of supplying current across the junction between the cover and the container body, however, such as auxiliary electrodes connected directly to a source of electricity, will be sufficient to effect a fusion, particularly at relatively low rates of production.

A cover feed means is associated with the turret 110 to supply a cover to each of the stations on the turret 110. As shown, the cover feed means comprises a body 138 having a hollow portion therein similar in cross section to a cover and which accepts covers from a cover conveyance chute 140 having a similar hollow portion 142 therein communicating with the first mentioned hollow portion. The hollow portion in the body 138 extends over the working table 124 and is open at the bottom of the body 138 at a place corresponding to the holes in the working table 124. A plunger 144 is timed with the rotation of the turret 110 to push a cover to a position at which the cover will fall into each hole over bottom head 100, or be positively placed in each hole, on the turret 110 as it rotates. Similarly, the cover may be positioned in each hole above the bottom head 100 if suitable lips are provided in the hole for supporting the cover. For fast turret rotation, a plurality of cover feed means in a series may be used to reduce the frequency at which each feed means must operate. In such a case, for example, each feed means in a series of three need place a cover in only every third hole rather than every hole. Furthermore, those in the art will realize that any other suitable mechanism or means for supplying a cover to each station as the turret rotates can be used.

A container body feed means is also associated with the turret 110 at a place later in rotation than the cover feed means. The container body feed means comprises a turret or vacuum dial 146 which accepts container bodies 106 from a conveyor, holds them in position on the dial 136 by a vacuum as it rotates, and then releases a container body at each station on the working table 124 when the vacuum is discharged. The dial 146 is driven, and also synchronized with the turret 110, by a drive gear 148 mounted on the same shaft 150 as the dial 146 and engaged with the drive gear 132 on the turret 110. A table 152 below the vacuum dial 146 and the same height as the working table 124 helps to keep the container bodies in position on the vacuum dial 136. Conveyor screws and other feed means can also be used, but the means described above is preferred.

A means for removing the finished containers from the stations on the turret 110 is associated with the turret 110 at a place later in rotation than the fusion operations described with respect to FIG. 8, which occur on the back side of the apparatus shown in FIG. 9. The preferred container removal means is similar to the preferred container body feed means and comprises a turret or vacuum dial 154 and a drive gear 156 mounted on the same shaft 158. The drive gear 156 engages the drive gear 132 on the turret 110, and thus both drives the vacuum dial 156 and synchronizes it with the stations on the turret 110. A table 160 below the vacuum dial 154 helps to keep the finished containers in position on the dial 154 until the vacuum is discharged and the containers are removed for use. Other container removal means, such as conveyor screws, can also be used.

In general, steel is the preferred material of construction, but those in the art will recognize that other materials may be employed advantageously for certain components, such as copper for the conductive heads.

It will be appreciated that the apparatus of the invention can provide a succession of containers at a very high rate of speed and that it will have long life because of the smooth continuity of operations involved as contrasted with jerky movements. Furthermore, the basic apparatus described specifically herein can be adapted for particular requirements. For example, the heads can include vacuum means for holding a cover or container body thereto before the heads move together to hold the cover against the container body. In such a case, the turret could rotate around a horizontal axis. Various feed and removal means are possible as well as various means for moving the heads together. A further modification is to mount each top head on a constant pressure spring to ensure that the cover is held against the container body under the most desirable pressure and to obtain a completely uniform product.

It will also be appreciated by those in the art that the invention provides a means for making square or oddly shaped containers at a high rate of speed. Other important features are that the fusion can be internal to avoid unsightly welds or rims on the exterior surfaces, and that predecorated covers and container bodies may be used to make containers since the process and apparatus involve few operations which can scar a can, and since the heat necessary to fuse a cover to a container body is localized to the contact therebetween. Furthermore, in contrast to the mechanical processes of the prior art, the invention eliminates the need for special sealants in the junction between the cover and container body to ensure a fluid-tight seal.

What is claimed is:

1. An apparatus for making containers at a high rate of speed from thin wall container bodies, each container body having an open end, and covers, each cover shaped to fit over said open end on said container body, one of said container body and said cover having a curl around its free end and the other having a corner at its free end which fits against an area on said curl; said apparatus comprising synchronized rotatable turrets having a plurality of stations spaced around the axis of each of said turrets, each of said stations of a first rotatable turret comprising a pair of opposing electrically conductive heads at least one of which is movable towards the other, one of said heads being shaped to fit against said cover and the other of said heads being shaped to fit against said container body; cover feed means for feeding one of said covers to a position relative to said head of said first turret corresponding thereto in each of said stations of said first turret as said first turret rotates; second rotatable turret means feeding said container bodies one at a time from a plurality of stations to a position relative to said head of said first turret corresponding thereto in each of said stations of said first turret as said first turret rotates; cam means for moving one of said heads towards the other in each of said stations of said first turret at a place later in rotation than the cover and container body feeding means to enable said heads to hold said cover against said container body under a positive pressure in each of said stations of said first turret as said first turret rotates; a transformer rotatably mounted along with said first turret and connected to a source of electricity on one side thereof and to said heads in each of said stations of said first turret on the other side thereof, said transformer being energizable to supply an electric current across the junction between said cover and said container body while under positive pressure to fuse said cover to said container body in each of said stations of said first turret as said first and second turrets rotate to form a succession of said containers; and third rotatable turret means having a plurality of stations for removing said containers from said stations of said first turret as said turrets rotate synchronously.

2. The apparatus of claim 1 wherein said cam means comprises a stationary cam track disposed beneath said stations of said first rotatable turret and being associated with the bottom head in each of said stations of said first turret so as to permit the bottom head to be advantageously disposed while passing said cover and container body feeding means to raise the bottom head at a place later in rotation than the cover and container body feeding means, thereby causing said heads of said first turret to hold each of said covers against each of said container bodies in each of said stations under a positive pressure, and to be advantageously disposed during subsequent removal of said cover and said container body from each of said stations.

3. The apparatus of claim 2 wherein each of said stations of said first rotatable turret comprises a substantially horizontal plate provided with a hole therein of a size which permits the covers to pass therethrough but not said container bodies, and to permit the withdrawal of said bottom head from within said container bodies.

References Cited by the Examiner
UNITED STATES PATENTS

| | | | |
|---|---|---|---|
| 1,141,517 | 6/1915 | Andrews | 219—81 |
| 1,504,088 | 8/1924 | Bransten | 219—129 X |
| 1,601,929 | 10/1926 | Tobey | 219—81 |
| 1,962,280 | 6/1934 | Melhinney | 113—121 |
| 3,095,499 | 6/1963 | Schurtteff et al. | 219—80 |
| 3,142,280 | 7/1964 | Heinle | 113—121 |

RICHARD M. WOOD, Primary Examiner.

B. A. STEIN, Assistant Examiner.